Feb. 18, 1947. W. E. HERON 2,415,883
TOBACCO SMOKING PIPE
Filed June 14, 1945
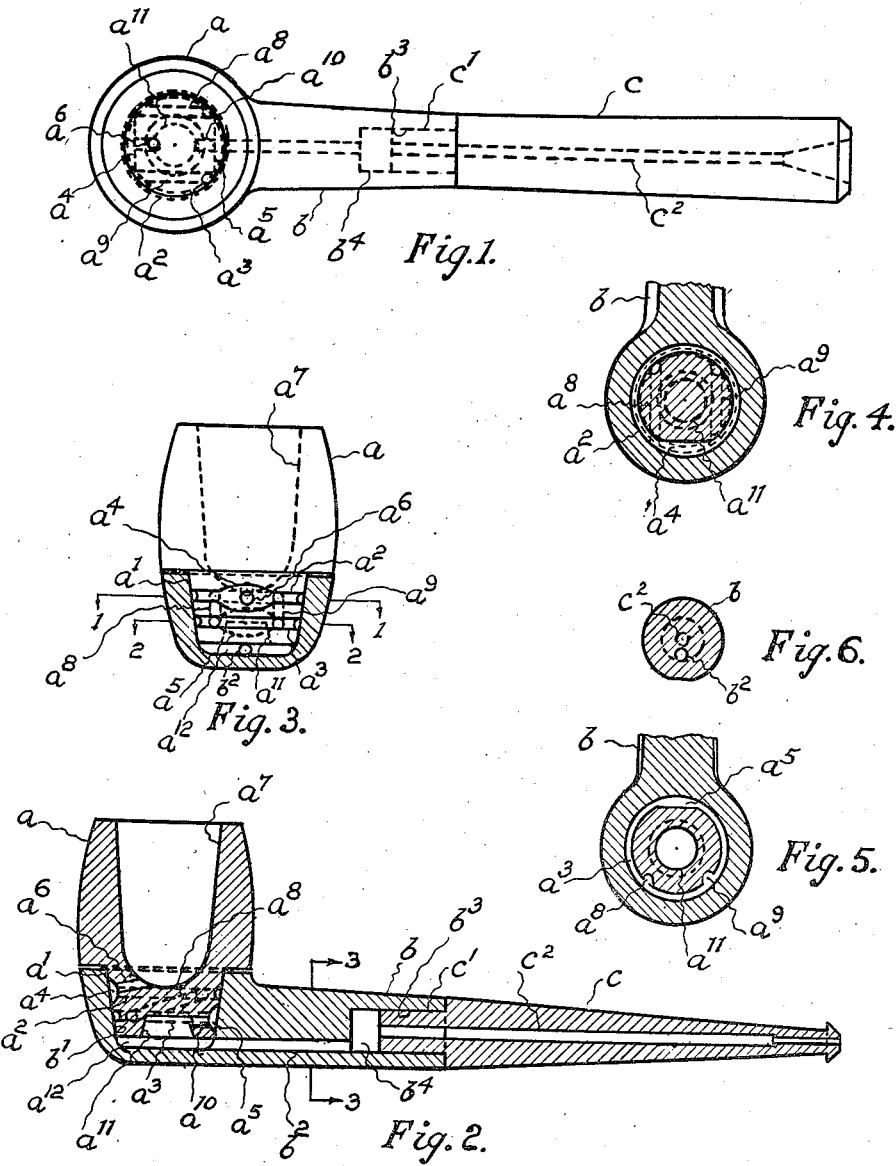
INVENTOR.
William Ernest Heron.

Patented Feb. 18, 1947

2,415,883

UNITED STATES PATENT OFFICE 2,415,883

TOBACCO SMOKING PIPE

William Ernest Heron, Detroit, Mich.

Application June 14, 1945, Serial No. 599,350

1 Claim. (Cl. 131—214)

This invention relates to improved smoking pipes, and has for its principal object to provide a pipe of such construction as will insure a very cool smoke, also to trap the noxious distillates present in both solid and liquid form.

These objects and the various embodiments of same will be fully described in detail and in reference to the drawing.

In the accompanying drawing, Figure 1 is a plan view of the smoking pipe.

Figure 2 is a sectional elevation of the smoking pipe showing the tapered removable bowl with the two notches, circumferential grooves, smoke passages, the recess for absorbent material, and expansion space between the end of tapered portion of bowl and bottom of the tapered hole of the stem.

Figure 3 is an end elevation of the bowl partly in section, showing notches, circumferential grooves, small smoke passages, the recess at the end of tapered portion of bowl for reception of absorbent material, and expansion space between the end of tapered portion and bottom of the tapered hole of the enlarged stem.

Figure 4 is a section on the line 1—1 of Figure 3 showing the top circumferential groove with notch, and the two small smoke passages leading from the groove to the lower circumferential groove.

Figure 5 is a section on the line 2—2 of Figure 3 showing the lower circumferential groove with notch, and the two small smoke passages leading from the top circumferential groove, and the recess for reception of absorbent material.

Figure 6 is a section on the line 3—3 of Figure 2 showing the stem body showing the small smoke passage.

In reference to the drawing the improved pipe as shown in Figures 1, 2, 3, 4, 5, and 6, comprises a removable bowl $a$ which at the lower end is reduced and tapered in diameter narrowing down towards the lower end $a^1$. Said tapered lower end fits frictionally in a tapered hole $b^1$ of the enlarged portion of the stem $b$, the axis of the tapered hole being at right angles to the stem $b$. Two spaced grooves $a^2$ and $a^3$ respectively are formed around the circumference of the tapered portion of the bowl, and are in communication with spaces or grooves $a^4$ and $a^5$ respectively which cut through the grooves, and are at right angles with the bowl axis, and are opposite one another as shown in Figure 2 but could be in any desired position around the circumference of bowl. If desired only one groove and space could be used. A hole $b^3$ at the end of stem $b$ is for the reception of the reduced diameter $c^1$ of mouth piece $c$ which has the usual smoke passage $c^2$. Near the circumference of the hole $b^3$ a small smoke passage $b^2$ is parallel to the axis of the stem leading to the bottom of the tapered hole $b^1$ of the enlarged portion of the stem. If desired the said smoke passage could be at an angle leading from the bottom of the tapered hole $b^1$ to the center of the stem hole $b^3$.

A smoke passage $a^6$ from the bottom of the tobacco chamber $a^7$ extends at an angle to the first expansion space $a^4$. The smoke expands and circulates around the groove $a^2$ to the small smoke passages $a^8$ and $a^9$ respectively which are at an angle to the second groove $a^3$. The smoke is drawn into and around the second groove $a^3$ leaving the groove at each end into a second expansion space $a^5$, from which the smoke is drawn through the small hole $a^{10}$ into a recess $a^{11}$ at the bottom of the tapered portion $a^1$ of bowl $a$, which is filled with absorbent material which traps the noxious distillates. The purified smoke expands in the expansion space $a^{12}$ between the end of tapered portion $a^1$ of bowl, and the bottom of tapered hole $b^1$ of the enlarged portion of stem $b$. The smoke continues on through the smoke passage $b^2$ leading from said expansion space, parallel to the stem axis, to the expansion space $b^4$ between the end of mouth piece and the end of hole, which could have absorbent material if desired. The purified and cool smoke continues on through the smoke passage $c^2$ of mouth piece C to mouth.

It is seen by the above description that the results of smoking the pipe is very desirable, as a very clean, purified and cool smoke is obtained. It is seen that when the bowl is taken off the enlarged stem the pipe is very easily cleaned.

It is to be understood that the form of my invention herewith shown and described is to be taken as a preferred example of the same and that various changes in the shape and size may be resorted to without departing from the spirit of the invention or the scope of the subjoined claim.

What I claim as new and desire to secure by Letters Patent is:

A tobacco smoking device comprising a stem having at its outer end an enlarged portion provided with a tapered hole, and having an enlarged hole at its inner end, a tobacco bowl having a tobacco chamber and a tapered lower end portion reduced in diameter, said tapered lower end portion being removably enclosed in said tapered hole to define an expansion space between the end of the tapered lower end portion and the bottom of the tapered hole, and a mouthpiece mounted in said enlarged hole of the stem, said tapered lower end portion having circumferentially disposed grooves and enlarged recesses formed on the periphery thereof, each of said recesses being disposed at right angles the to bowl axis and communicating with the ends of one of said grooves, a passage from the tobacco chamber leading to one of said recesses, a second and a third passage through the tapered portion of the bowl member connecting a pair of adjacent grooves, a fourth passage through the said tapered portion leading from one of said recesses to said expansion space and a fifth passage parallel to the axis of the stem and connecting said expansion space and said enlarged hole.

WILLIAM ERNEST HERON.

REFERENCES CITED

The following references are of record in the file of this patent:

FOREIGN PATENTS

| Number | Country | Date |
| --- | --- | --- |
| 14,515 | England | A. D. 1894 |
| 114,727 | England | Apr. 18, 1918 |